(12) United States Patent
Lange et al.

(10) Patent No.: US 6,760,491 B2
(45) Date of Patent: Jul. 6, 2004

(54) DEVICE THAT SCANS BOTH SIDES OF A PHOTO AND ASSOCIATES INFORMATION FOUND ON THE BACK OF THE PHOTO WITH THE PHOTO

(75) Inventors: Peter J Lange, Windsor, CO (US); David W Boyd, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 565 days.

(21) Appl. No.: 09/731,518

(22) Filed: Dec. 6, 2000

(65) Prior Publication Data

US 2002/0067851 A1 Jun. 6, 2002

(51) Int. Cl.[7] .............................. G06K 9/20; G06K 7/10; H04N 1/04
(52) U.S. Cl. ..................... 382/321; 358/474; 358/509
(58) Field of Search ................................ 382/312, 321, 382/135, 137, 138, 322, 323, 324; 358/475, 509, 474, 497, 494, 408

(56) References Cited

U.S. PATENT DOCUMENTS

| | | | | |
|---|---|---|---|---|
| 4,743,974 A | * | 5/1988 | Lockwood | 358/494 |
| 4,949,189 A | * | 8/1990 | Ohmori | 358/474 |
| 5,444,794 A | * | 8/1995 | Uhland, Sr. | 705/45 |
| 5,463,217 A | | 10/1995 | Sobol et al. | |
| 5,568,573 A | * | 10/1996 | Wada et al. | 382/317 |
| 5,592,576 A | * | 1/1997 | Hayashi | 382/318 |
| 5,619,594 A | | 4/1997 | Melen | |
| 6,038,553 A | * | 3/2000 | Hyde, Jr. | 705/45 |
| 6,181,837 B1 | * | 1/2001 | Cahill et al. | 382/305 |

FOREIGN PATENT DOCUMENTS

GB   2370711 A   3/2002

OTHER PUBLICATIONS

Payne et al. "Document Segmentation Using Texture Analysis." Proc. of the Int. Conf. on Pattern Recognition. vol. 2, Oct. 9, 1994, pp. 380–382.*

* cited by examiner

Primary Examiner—Jon Chang
(74) Attorney, Agent, or Firm—Leslie B. Gehman

(57) ABSTRACT

By scanning both sides of a photographic print, data from the back of the print may be associated with the image. If the backside data includes text, optical character recognition (OCR) techniques optionally may be used to convert the image of the back of the photo into text that may be included in a database or other data structure allowing the text to be associated with the photographic image. This allows the user to quickly and easily search a large database of images for either a specific image or a group of images according to some set of search criteria.

36 Claims, 4 Drawing Sheets

DEVICE THAT SCANS BOTH SIDES OF A PHOTO AND ASSOCIATES INFORMATION FOUND ON THE BACK OF THE PHOTO WITH THE PHOTO

FIELD OF THE INVENTION

The present invention relates to an image capture system and, more particularly, to a method and apparatus for capturing reflective data from both sides of a photo.

BACKGROUND OF THE INVENTION

Image capture devices are currently used for a wide variety of applications. Typical applications include document scanning (possibly including optical character recognition (OCR)), digital photography, photographic print scanning, and photographic transparency scanning. Many photographers currently capture images to photographic films using standard 35 mm, medium format, or large format cameras. The resulting print (or film) may then be digitally captured using a scanner. Many of these scanners allow only the capture of images from either transparencies or prints. Some scanners, such as the Hewlett-Packard PhotoSmart™ S20 (Hewlett-Packard Company, Palo Alto, Calif.), allow the user to choose between scanning a print, a 35 mm mounted transparency, or a strip of 35 mm film.

Many photo labs print information about the photo, or about the processing on the back of the photographic prints they produce. The advanced photo system (APS) allows cameras to include information such as the date and time, film frame number, cartridge identification number, exposure settings, etc. on an optically clear, but magnetically sensitive coating on both edges of the APS film. The photo lab may then read this information during processing and print it on the back of each photo. Further, many people add their own notations on the backs of their photos, including the names of people in the photos or the location where the photo was taken. Currently, when photographers scan their prints, they usually scan the image on the front of the print and often neglect the information on the back of the print. Thus, there is a need in the art for a method and apparatus that automatically scans both sides of the print and maintains a correlation of the image data with the backside data.

SUMMARY OF THE INVENTION

By scanning both sides of a photographic print, data from the back of the print may be associated with the image. If the backside data includes text, optical character recognition (OCR) techniques may be used to convert the image of the back of the photo into text that may be included in a database or other structure allowing the text to be associated with the photographic image. This allows the user to quickly and easily search a large database of images for either a specific image or a group of images according to some set of search criteria.

Other aspects and advantages of the present invention will become apparent from the following detailed description, taken in conjunction with the accompanying drawings, illustrating by way of example the principles of the invention.

DETAILED DESCRIPTION

Figure 1:
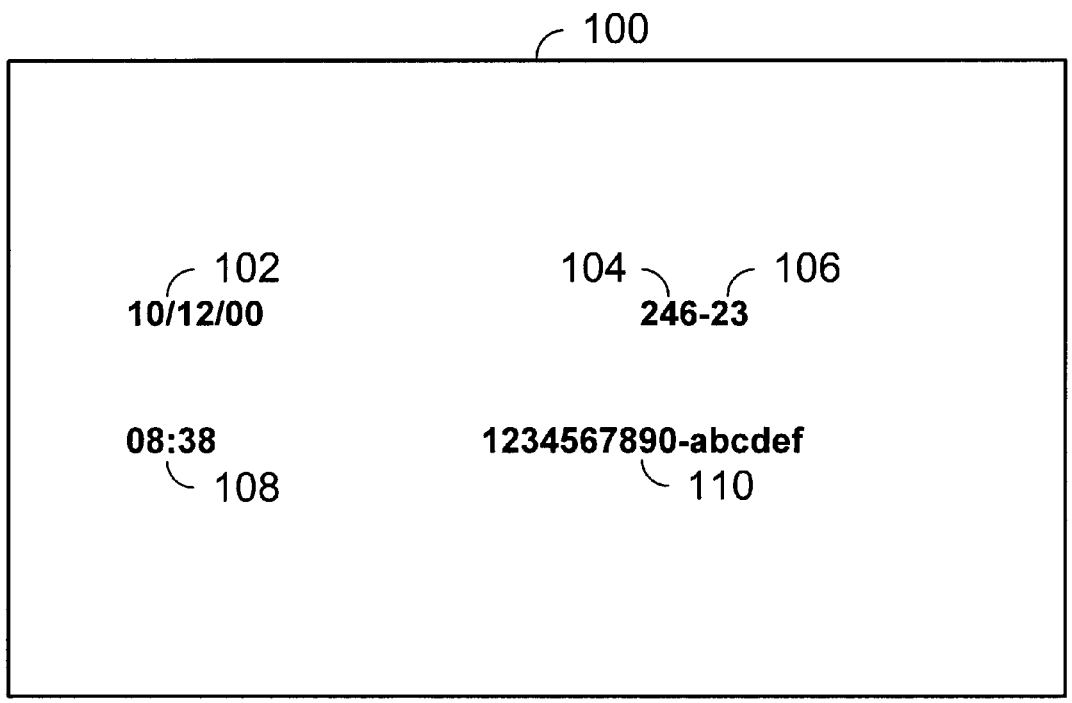
FIG. 1 is a drawing of an example of the information that may be included on the back of a photographic image.

FIG. 1 is a drawing of an example of the information that may be included on the back of a photographic image. The backside of a photo 100 may contain information relating to the image. Example of such information include the date the photo was taken 102, the roll number 104, the frame number 106, the time the photo was taken 108, and information from the processor 110. The information from the processor 110 may include data about the color bias used to make the print, the order number, and other identifying information.

Figure 2:
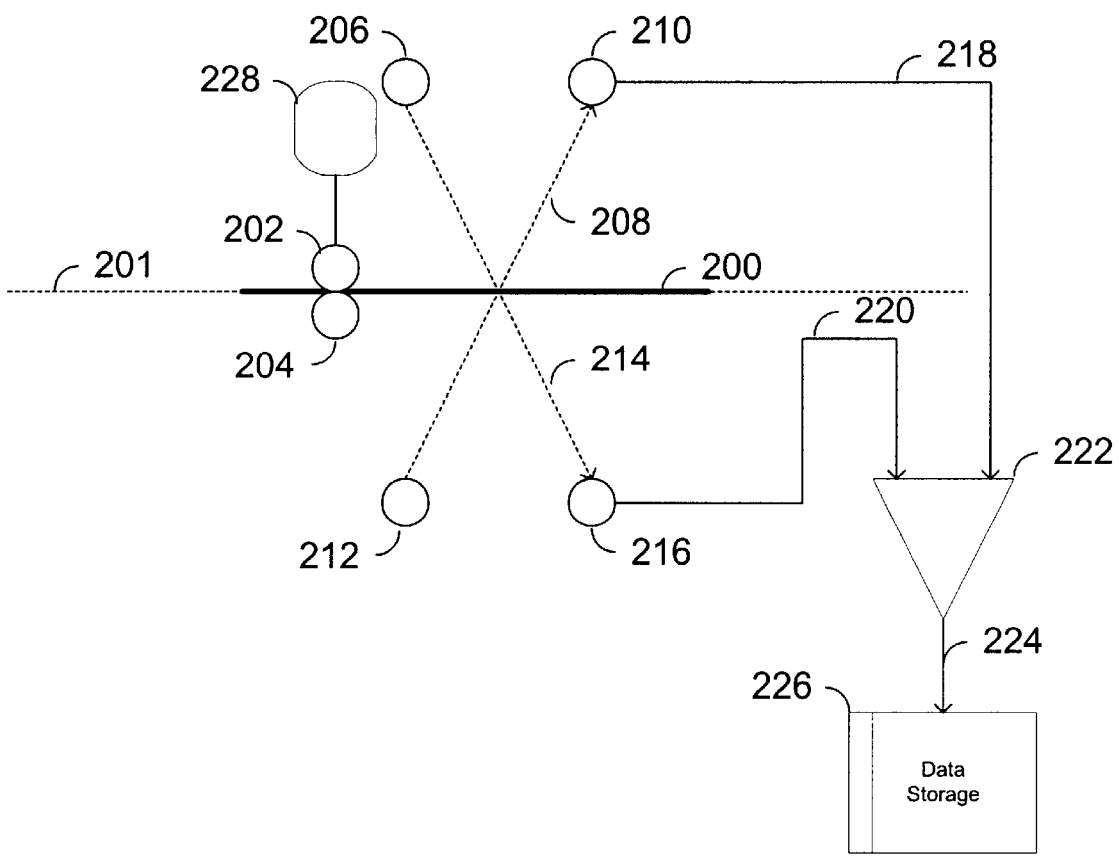
FIG. 2 is a drawing of one possible configuration of an apparatus for scanning both sides of a photographic image.

FIG. 2 is a drawing of one possible configuration of an apparatus for scanning both sides of a photographic image. In this example configuration, an object 201 passing through the image plane 200 is shifted by an upper roller 202 and a lower roller 204, driven by a motor 228 past first and second scanner hardware. This object 201 may be a photo, magazine article, drawing, or other substantially planar object. The first surface of the object 201 in the image plane 200 is illuminated by a first light source 206. The first light path 208 reflects off the object in the image plane 200 and strikes the first sensor 210 where the first digital image data is captured. The second surface of the object 201 in the image plane 200 is illuminated by a second light source 212. The second light path 214 reflects off the second surface of the object 201 in the image plane 200 and strikes the second sensor 216 where the second digital image data is captured. The first digital image data from the first sensor 218 is associated with the second digital image data from the second sensor 220 in a processing block 222 and the associated data 224 may then be stored in a data storage unit 226. Note that the processing block 222 is shown in more detail in FIG. 3A and FIG. 3B. Processing may take place in hardware, or it may simply consist of a software method associating the two images within the data storage unit 226.

Another possible embodiment of this invention may use one or more motors to move the light sources and sensors relative to the image plane instead of moving the object through the image plane. Also, it is possible to construct the present invention using a single light source. Mirrors or other optical devices may be used to illuminate both sides of the object in the image plane for image capture by the first and second sensors. Alternately, a single light source and sensor may be used, and mechanisms within the scanner may flip the object between two passes through the image plane.

Figure 3A:
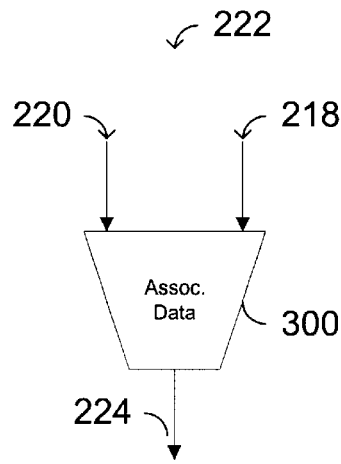
FIG. 3A and FIG. 3B are block diagrams of possible contents of the processing block from FIG. 2.
Figure 3B:
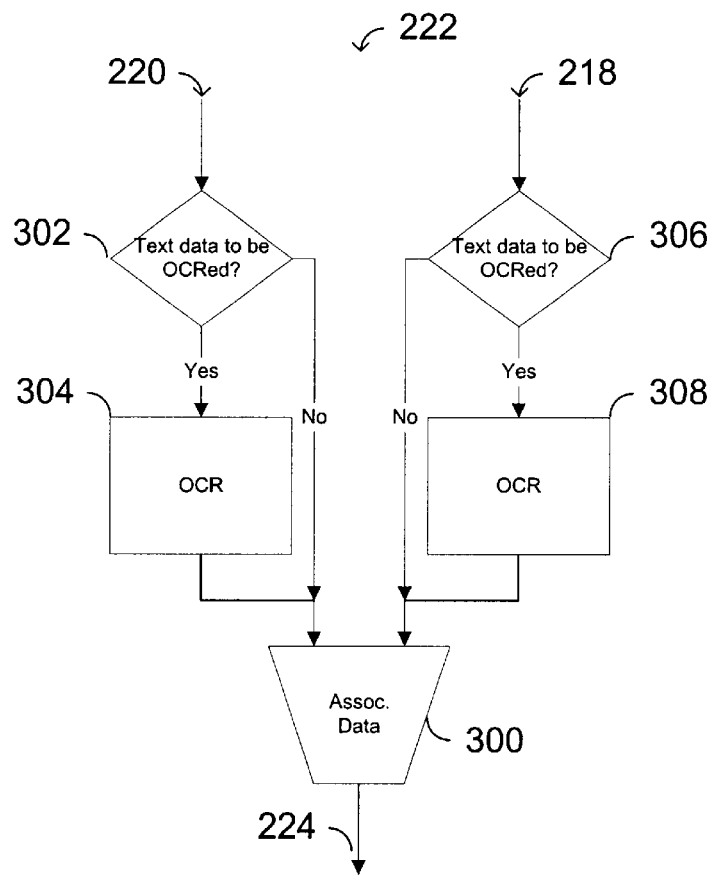

FIG. 3A and FIG. 3B are block diagrams of possible contents of the processing block 222 from FIG. 2. In a simple embodiment, shown in FIG. 3A, the data from the first sensor 218 and the data from the second sensor 220 are simply associated with each other as they are output 224 for storage. In a somewhat more powerful configuration, shown in FIG. 3B, the data from the first sensor 218 is examined in a first decision step 306. If the first digital image data 218 contains textual information the data may be passed through a first OCR 308 where it is converted to first text data. This OCR step is optional since the text data may be handwritten, or otherwise unsuitable for the OCR process. Further, the user may want to keep the text data in an image format instead of a text format (such as ASCII). In these cases and when there is no text data present, the first digital image data 218 bypasses the first OCR 308 and goes directly to the association block 300. Also, the data from the second sensor 220 is examined in a second decision step 302. If the second digital image data 220 contains textual information the data is passed through a second OCR 304 where it is converted to second text data. This OCR step is optional since the text data may be handwritten, or otherwise unsuitable for the OCR process. Further, the user may want to keep the text data in an image format instead of a text format (such as ASCII). In these cases and when there is no text data present, the second digital image data 220 bypasses the second OCR 304 and goes directly to the association block 300. Within the association block 300, the first digital image data 218 is associated with the second digital image data 220 when neither image data contains textual information. The first text data is associated with the second digital image data 220 when the first image data contains textual information. The first digital image data 218 is associated with the second text data when the second image data contains textual information. The text data associated with the digital image may be considered metadata, containing information pertinent to the image, such as location or date or other information.

Figure 4:
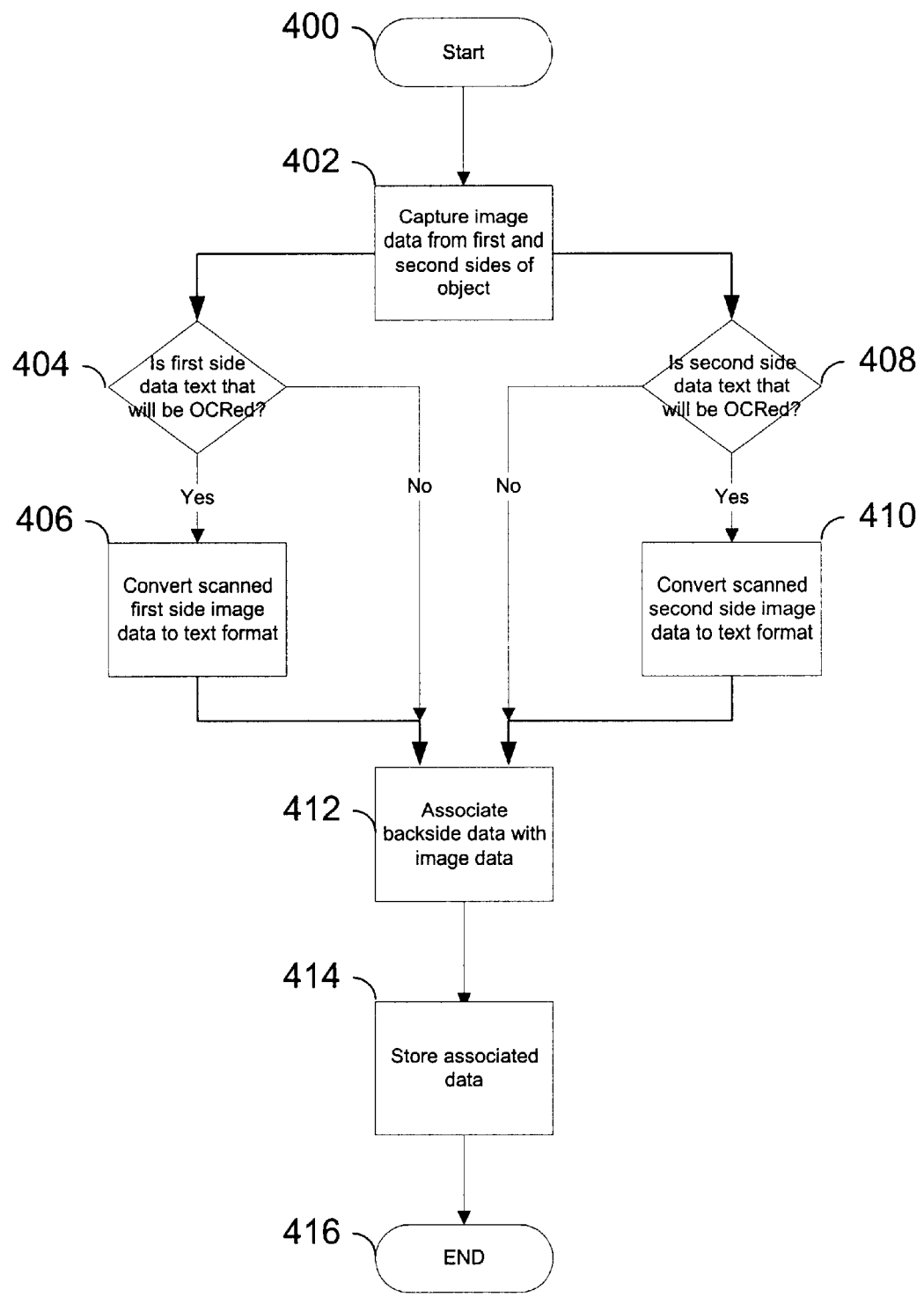
FIG. 4 is a flowchart of a method for scanning both sides of a photographic image and associating the data from the back of the photo with the image.

FIG. 4 is a flowchart of a method for scanning both sides of a photographic image and associating the data from the back of the photo with the image. After a start step 400, in a scanning step 402, image data from both the first and second sides of the object is captured. Note that this scanning step 402 may be implemented in two sub-steps where the front of the object is scanned in one sub-step and the back of the object is scanned in another sub-step. In a first decision step 404, if the first side data comprises text, an optional first OCR step 406 may be performed to convert the first side scanned image data into first text data. In a second decision step 408, if the second side data comprises text, an optional second OCR step 410 may be performed to convert the second side scanned image data into second text data. The two OCR steps are optional since any text may be handwritten, or otherwise unsuitable for the OCR process. Further, the user may desire to keep the text data in an image format instead of a text format. In an association step 412, the first side image or text data is associated with the second side image or text data, and in a storage step 414 the associated data is stored in memory, on a hard disk, on a CDROM, or on other recordable media. The method then reaches an end step 416.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An image capture device comprising:
    a light source configured to illuminate at least a first and a second surface of an object in an imaging plane, wherein said first and second surfaces are approximately opposite sides of a common plane;
    a first sensor positioned relative to said light source to capture a first digital image from said first surface of said object; and
    a second sensor positioned relative to said light source to capture a second digital image from said second surface of said object, wherein at least some of said first digital image and at least some of said second digital image are captured concurrently.

2. The image capture device recited in claim 1 further comprising:
    an association device that associates said first digital image with said second digital image.

3. The image capture device recited in claim 2 further comprising:
    a motor coupled to said object, that moves said object relative to said sensors through said imaging plane.

4. The image capture device recited in claim 2 further comprising:
    a motor coupled to said sensors, that moves said sensors relative to said imaging plane.

5. The image capture device recited in claim 1 further comprising:
    an optical character recognition device that receives said first digital image from said first sensor and converts said first digital image into first text data when said first digital image contains textual information.

6. The image capture device recited in claim 5 further comprising:
    an association device that associates said first text data from said optical character recognition device with said second digital image.

7. The image capture device recited in claim 6 further comprising:
    a motor coupled to said object, that moves said object relative to said sensors through said imaging plane.

8. The image capture device recited in claim 6 further comprising:
    a motor coupled to said sensors, that moves said sensors relative to said imaging plane.

9. The image capture device recited in claim 1 further comprising:
    an optical character recognition device that receives said second digital image from said second sensor and converts said second digital image into second text data when said second digital image contains textual information.

10. The image capture device recited in claim 9 further comprising:
    an association device that associates said second text data from said optical character recognition device with said first digital image.

11. The image capture device recited in claim 10 further comprising:
    a motor coupled to said object, that moves said object relative to said sensors through said imaging plane.

12. The image capture device recited in claim 10 further comprising:
    a motor coupled to said sensors, that moves said sensors relative to said imaging plane.

13. The image capture device recited in claim 1 further comprising:
    an optical character recognition device that receives said first digital image from said first sensor and converts said first digital image into first text data when said first digital image contains textual information, and receives said second digital image from said second sensor and converts said second digital image into second text data when said second digital image contains textual information.

14. The image capture device recited in claim 13 further comprising:

an association device that associates said first text data from said optical character recognition device with second image data when said first digital image contains textual information, and associates said second text data from said optical character recognition device with said first digital image when said second image data contains textual information, and associates said first image data with said second image data when said first digital image and said second digital image contain no textual information.

15. The image capture device recited in claim 14 further comprising:

a motor coupled to said object, that moves said object relative to said sensors through said imaging plane.

16. The image capture device recited in claim 14 further comprising:

a motor coupled to said sensors, that moves said sensors relative to said imaging plane.

17. The image capture device recited in claim 1 further comprising:

a text detector configured to receive said first digital image from said first sensor, wherein said text detector signals presence of textual information in said first digital image.

18. The image capture device recited in claim 17 further comprising:

an optical character recognition device connected to said first sensor and said text detector, wherein said optical character recognition device converts said first digital image into first text data when said text detector signals the presence of text data in said first digital image; and an association device that associates said first digital image with said second digital image when said text detector does not signal the presence of textual information in said first digital image, and associates said first text data with said second image data when said text detector signals the presence of textual information in said first digital image.

19. The image capture device recited in claim 18 further comprising:

a motor coupled to said object, that moves said object relative to said sensors through said image plane.

20. The image capture device recited in claim 18 further comprising:

a motor coupled to said sensors, that moves said sensors relative to said image plane.

21. The image capture device recited in claim 1 further comprising:

a text detector configured to receive said first digital image from said first sensor, and said second digital image from said second sensor, wherein said text detector asserts a first text signal when textual information is present in said first digital image, and asserts a second text signal when textual information is present in said second digital image.

22. The image capture device recited in claim 21 further comprising:

an optical character recognition device connected to said first and second sensors and said text detector, wherein said optical character recognition device converts said first digital image to first text data when said first text signal is asserted, and converts said second digital image to second text data when said second text signal is asserted; and an association device that associates said first text data with said second digital image when said first text signal is asserted, and associates said first digital image with said second text data when said second text signal is asserted, and associates said first text data with said second text data when said first and second text signals are asserted, and associates said first digital image with said second digital image when said first and second text signals are not asserted.

23. The image capture device recited in claim 22 further comprising:

a motor coupled to said object, that moves said object relative to said sensors through said image plane.

24. The image capture device recited in claim 22 further comprising:

a motor coupled to said sensors, that moves said sensors relative to said image plane.

25. A method for capturing images comprising the steps of:

a) illuminating at least a first and a second surface of an object in an imaging plane using a single light source, wherein said first and second surfaces are approximately opposite sides of a common plane;

b) digitally capturing a first digital image from a first surface of an object in an imaging plane;

c) digitally capturing a second digital image from a second surface of said object, wherein said first and second surfaces are approximately opposite sides of a common plane, and wherein at least some of said first digital image and at least some of said second digital image are captured concurrently; and d) associating said first digital image with said second digital image.

26. The method recited in claim 25 further comprising the step of:

e) performing optical character recognition on said first digital image producing first text data when said first digital image contains textual information.

27. The method recited in claim 26 wherein step d) associates said first text data with said second digital image.

28. The method recited in claim 25 further comprising the step of:

e) performing optical character recognition on said second digital image producing second text data when said second digital image contains textual information.

29. The method recited in claim 28 wherein step d) associates said first digital image with said second text data.

30. An image capture device comprising:

means for illuminating at least a first and a second surface of an object in an imaging plane using a single light source, wherein said first and second surfaces are approximately opposite sides of a common plane;

means for capturing a first digital image from a first surface of an object in an image plane;

means for capturing a second digital image from of a second surface of said object, wherein said first and second surfaces are approximately opposite sides of a common plane, and wherein at least some of said first digital image and at least some of said second digital image are captured concurrently; and means for associating said first digital image with said second digital image.

31. The device recited in claim 30 further comprising:

means for converting said first digital image data into first text data when said first digital image data contains textual information.

32. The device recited in claim 31 wherein said means for associating, associates said first text data with said second digital image.

33. The device recited in claim 30 further comprising:

means for converting said second digital image data into second text data when said second digital image contains textual information.

34. The device recited in claim 33 wherein said means for associating, associates said first digital image with said second text data.

35. The device recited in claim 30 further comprising:

means for converting said first digital image into first text data when said first digital image contains textual information; and means for converting said second digital image into second text data when said second digital image contains textual information.

36. The device recited in claim 35 wherein said means for associating, associates said first text data with said second text data.

* * * * *